United States Patent
Inamoto et al.

(10) Patent No.: US 8,581,936 B2
(45) Date of Patent: Nov. 12, 2013

(54) METHOD AND APPARATUS FOR GENERATING IMAGE DISPLAY DATA

(75) Inventors: Hirohisa Inamoto, Kanagawa (JP); Koji Kobayashi, Kanagawa (JP); Yuka Kihara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 728 days.

(21) Appl. No.: 12/198,410

(22) Filed: Aug. 26, 2008

(65) Prior Publication Data

US 2009/0067747 A1 Mar. 12, 2009

(30) Foreign Application Priority Data

Sep. 12, 2007 (JP) ................................. 2007-236428

(51) Int. Cl.
*G09G 5/00* (2006.01)

(52) U.S. Cl.
USPC ........................................................ 345/660

(58) Field of Classification Search
None
See application file for complete search history.

(56) References Cited

U.S. PATENT DOCUMENTS

| | | | | |
|---|---|---|---|---|
| 6,400,375 B1 * | 6/2002 | Okudaira | ...................... | 345/668 |
| 6,466,237 B1 * | 10/2002 | Miyao et al. | .................. | 715/838 |
| 6,628,283 B1 * | 9/2003 | Gardner | ......................... | 345/427 |
| 6,704,034 B1 * | 3/2004 | Rodriguez et al. | ............. | 715/860 |
| 6,832,221 B2 * | 12/2004 | Takahashi | ............................. | 1/1 |
| 6,859,909 B1 * | 2/2005 | Lerner et al. | ................. | 715/203 |
| 7,406,198 B2 * | 7/2008 | Aoki et al. | .................... | 382/218 |
| 7,420,540 B2 * | 9/2008 | Olbrich | ......................... | 345/158 |
| 7,434,177 B1 * | 10/2008 | Ording et al. | ................. | 715/862 |
| 7,496,278 B2 * | 2/2009 | Miyamoto et al. | ............ | 386/248 |
| 7,716,604 B2 * | 5/2010 | Kataoka et al. | ................ | 715/835 |
| 8,120,577 B2 * | 2/2012 | Bouvin et al. | ................. | 345/157 |
| 2003/0169286 A1 * | 9/2003 | Misawa | ........................ | 345/716 |
| 2006/0247855 A1 * | 11/2006 | de Silva et al. | ............... | 701/212 |
| 2007/0229491 A1 | 10/2007 | Saitoh | | |
| 2007/0242902 A1 | 10/2007 | Kobayashi et al. | | |
| 2008/0134070 A1 | 6/2008 | Kobayashi et al. | | |
| 2008/0253695 A1 * | 10/2008 | Sano et al. | .................... | 382/305 |

FOREIGN PATENT DOCUMENTS

| | | |
|---|---|---|
| CN | 101047756 A | 10/2007 |
| JP | 11-65812 | 3/1999 |
| JP | 2004-96329 | 3/2004 |
| JP | 3614235 | 11/2004 |
| JP | 2007-25457 | 2/2007 |
| JP | 2007-286864 | 11/2007 |

OTHER PUBLICATIONS

Office Action issued Sep. 2, 2010, in Chinese Patent Application No. 200810149434.2 (with English translation).

* cited by examiner

*Primary Examiner* — Daniel Hajnik
*Assistant Examiner* — Anh-Tuan V Nguyen
(74) *Attorney, Agent, or Firm* — Oblon, Spivak, McClelland, Maier & Neustadt, L.L.P.

(57) ABSTRACT

An apparatus generates display data on a display unit. An image constructing unit constructs an image of an image list including a plurality of images each corresponding to an image data file. A data output unit outputs first display data of the image list, and then, when a switching command is received from a user, outputs second display data of the image list in response to the switching command. A confirmation calculating unit calculates a degree of confirmation indicating whether a user confirmation is performed for each of the images in the image list. An image modifying unit modifies the images in the image list based on the degree of confirmation.

14 Claims, 3 Drawing Sheets

METHOD AND APPARATUS FOR GENERATING IMAGE DISPLAY DATA

CROSS-REFERENCE TO RELATED APPLICATIONS

The present application claims priority to and incorporates by reference the entire contents of Japanese priority document 2007-236428 filed in Japan on Sep. 12, 2007.

BACKGROUND OF THE INVENTION

1. Field of the Invention

The present invention relates to a technology for generating image display data.

2. Description of the Related Art

Recently, it has been widely performed to scan paper-based graphics or documents as images with a scanner to digitalize them along with a cost reduction of a scanner, enforcement of the electronic document law, or the like. Digitized graphics or documents are stored as image data files, which brings about an effect of saving storage space.

However, it is difficult to search for a desired image data file from among a large number of image data files in a recording medium such as a hard disk.

To solve this problem, software for managing image data files has been developed and widely used, with which images based on a plurality of image data files stored in a recording medium are displayed in a list as size-reduced images called thumbnails. With this software, a user can roughly identify each image by the thumbnails and can easily find a desired image data file by relying on ambiguous memory of the image. Upon confirming that the thumbnail displayed on the screen is the desired image, the user can cause the details of the image to be displayed on the screen by starting image display software by clicking the thumbnail with a mouse.

An information search device is disclosed in Japanese Patent No. 3614235 as a device utilizing the technology of displaying a list of such thumbnails.

However, it is difficult to specify the area that a user has already confirmed in the conventional thumbnail list. Therefore, if the user scrolls the thumbnail list incorrectly, an operation of confirming thumbnails becomes complex. Specifically, if the number of the image data files is large, not all the thumbnails corresponding to the image data files are displayed on the screen simultaneously. Therefore, some thumbnails in part of the thumbnail list (hereinafter, "display area") are displayed on the screen. The user scrolls the screen with a mouse or the like to move the display area if needed, and displays thumbnails that were not displayed on the screen. If the user operates the mouse incorrectly to scroll the display area quickly and the user could not confirm thumbnails, the user needs to scroll the display area in a backward direction to confirm the thumbnails. In this case, the display area is desirably scrolled in the backward direction at a stroke to return to the preceding state instantly; however, the user cannot determine a scrolling amount to return to the preceding state. Therefore, the user needs to scroll the display area slowly in the backward direction to confirm thumbnails one by one until the user finds a thumbnail that the user has already seen before. Thereafter, if the user needs to confirm unconfirmed thumbnails, the user needs to move the display area to an unconfirmed-area by scrolling the display area in a forward direction. In this case, the user needs to scroll the display area slowly in the forward direction and confirm the thumbnails that the user has already confirmed for a while again, which is useless.

SUMMARY OF THE INVENTION

It is an object of the present invention to at least partially solve the problems in the conventional technology.

According to an aspect of the present invention, there is provided an apparatus for generating display data for displaying an image on a display unit. The apparatus includes an image constructing unit that constructs an image of an image list including a plurality of images each corresponding to an image data file arranged in a form of list; a data output unit that outputs first display data for displaying a first display of the image list on the display unit, and then, when a switching command for switching at least one of a display area and a display magnification is received from a user, outputs second display data for displaying a second display of the image list in response to the switching command; a confirmation calculating unit that calculates a degree of confirmation indicating whether a user confirmation is performed for each of the images in the image list; and an image modifying unit that modifies the images in the image list based on the degree of confirmation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings.

In the embodiments, dedicated file managing software is installed in a personal computer (PC) to function as a data generating apparatus to which the present invention is applied.

The data generating apparatus according to the present embodiment is capable of generating an image list based on image data files stored in a hard disk of a multi-function printer (MFP) with a built-in scanner that has rapidly spread to general households.

Figure 1:
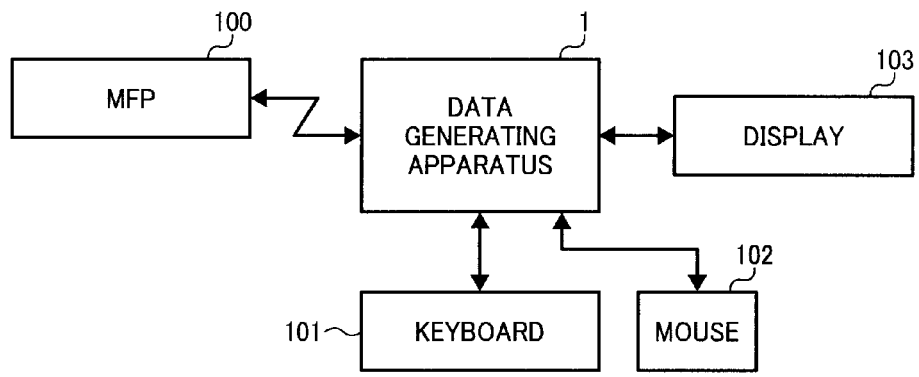
FIG. 1 is a block diagram of a data generating apparatus and its peripherals according to a present embodiment of the present invention.

FIG. 1 is a block diagram of a data generating apparatus 1 and its peripherals according to the embodiment. Connected to the data generating apparatus 1 are a keyboard 101 and a mouse 102 as input units by which a user can make an instruction. The data generating apparatus 1 is connected also to a display 103 as a display unit and an MFP 100 with scanner. The MFP 100 includes a hard disk (not shown) as a recording medium for storing therein image data scanned by the scanner as an image data file in bitmap format, Joint Photographic Experts Group (JPEG) format, graphics interchange format (GIF), or the like.

When the software is started by a user operating the keyboard 101 or the mouse 102, the data generating apparatus 1 accesses the hard disk of the MFP 100 via a network cable to obtain data about a file storing state of the hard disk, and causes the display 103 to display the file storing state thereon. The user specifies a directory (folder) containing a desired file in the hard disk by referring to the display on the display 103. Then, the data generating apparatus 1 transmits a transmission request signal to the MFP 100 via the network cable for requesting transmission of image data files stored in the specified directory. The MFP 100 transmits all image data files stored in the specified directory to the data generating apparatus 1 based on the transmission request signal.

The data generating apparatus 1 stores therein the image data files received from the MFP 100 in a temporary storing area in the hard disk thereof. Then, the data generating apparatus 1 loads and processes images corresponding to the image data files, and generate an image of an image list in which the images are arranged in a matrix manner. The image list is partially displayed on the display 103.

Figure 2:
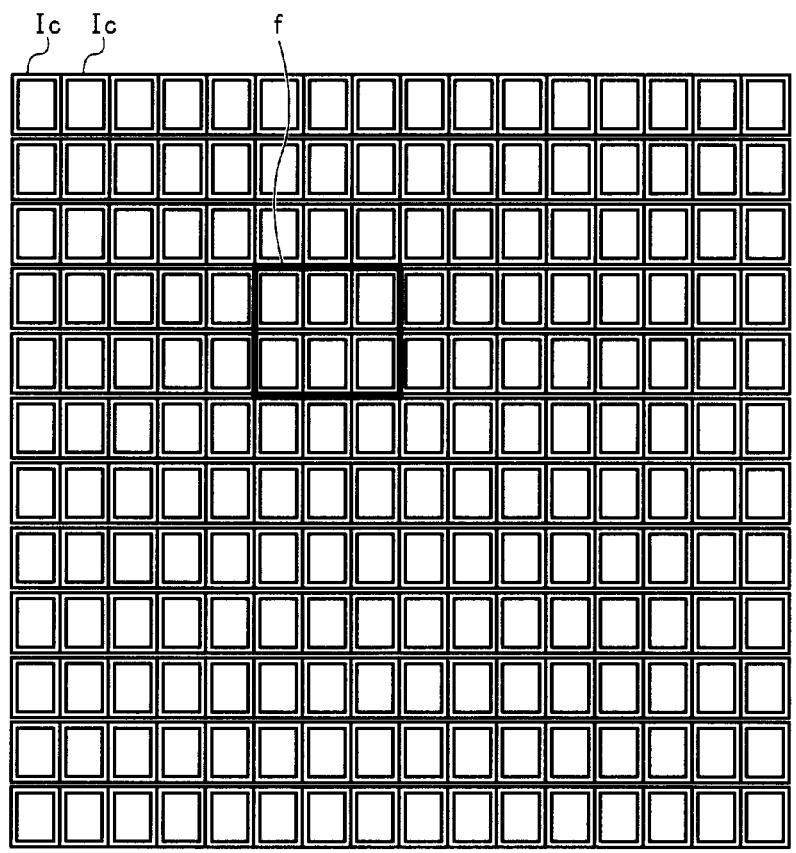
FIG. 2 is a schematic diagram illustrating an image list generated by the data generating apparatus.

FIG. 2 is a schematic diagram illustrating the image list generated by the data generating apparatus 1. As shown in FIG. 2, small rectangles arranged in a matrix manner represent images Ic generated based on the image data files, and an area surrounded by a bold line f represents a display area that is part of the image list to be displayed on the display 103. The display area includes 6 images Ic (2(longitudinal)×3(lateral)) in the example shown in FIG. 2; however, a user can change the number of images in the display area to 24 (4(longitudinal)×6(lateral)) at a maximum. The size of the display area is fixed, so that resolution and magnification of images become lower as the number of images in the display area increases.

A user can move the display area in the longitudinal direction or the lateral direction or increase or decrease the number of the images displayed in the display area (magnification of the displayed images) by using the keyboard 101 or the mouse 102. Specifically, the user can move a mouse pointer displayed on the screen in the display 103 by moving the mouse 102. Moreover, with a drag operation (switching operation) by using the mouse 102, the user can move (scroll) the display area in the longitudinal direction or the lateral direction. Furthermore, the user can increase or decrease the magnification of the displayed images by rotating a wheel of the mouse 102 (switching operation), in accordance of which the number of the displayed images is increased or decreased.

Figure 3:
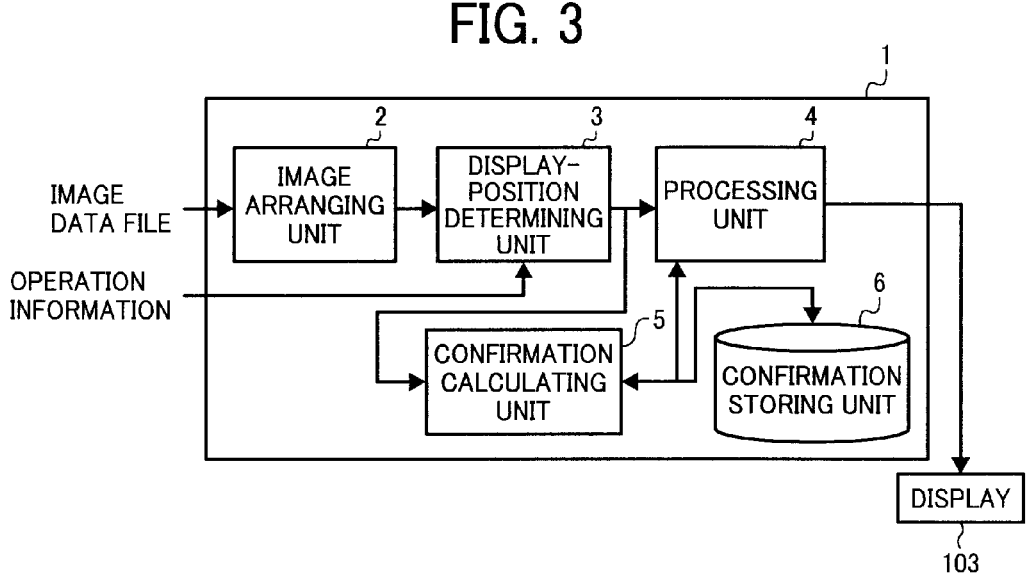
FIG. 3 is a block diagram of the data generating apparatus shown in FIG. 1.

FIG. 3 is a block diagram of the data generating apparatus 1 illustrating a connection state of devices that correspond to functions of the data generating apparatus 1. As shown in FIG. 3, the data generating apparatus 1 includes an image arranging unit 2, a display-position determining unit 3, a processing unit 4, a confirmation calculating unit 5, and a confirmation storing unit 6. In practice, the data generating apparatus 1 is not manufactured as an apparatus dedicated to generating the image display data, but functions as an apparatus for generating the image display data by executing the dedicated software. Therefore, in practice, a central processing unit (CPU), a random access memory (RAM), a hard disk, and the like in the PC function as the devices in FIG. 3.

As shown in FIG. 3, a plurality of image data files received from the MFP 100 is input to the image arranging unit 2. The image arranging unit 2 loads and processes images based on the image data files, and arranges the images in a matrix manner, thereby generating the image list.

The display-position determining unit 3 determines the display area of the image list on the screen based on information about the operation by a user. The confirmation calculating unit 5 calculates a degree of confirmation for each image in the image list based on the information about the operation by a user. The degree of confirmation can be calculated from multiple values and is used to determine whether a user has confirmed an image. If the number of the images displayed in the image list is large, it is difficult to determine an area in which a user has confirmed images in the image list. Even for the images in the area displayed on the screen of the display 103, it is difficult in some cases to determine that all the images have been confirmed. Therefore, the degree of confirmation is calculated for each image. Then, the processing unit 4 performs modification on the images based on the degree of confirmation calculated by the confirmation calculating unit 5.

The degree of confirmation is calculated by the confirmation calculating unit 5 based on a distance d (pixels) from the center of the display area on the screen of the display 103 (a center of gravity of a rectangular screen) to the center of an image, a magnification factor z of an image, a display time t (seconds), and the like. The magnification factor z is from zero to one, that is, an image displayed on the display 103 has a size equal to its full size at the maximum. The display time t is not a cumulative display time for each image but a value of binary data representing a display time for each scroll. In a typical word processor, a screen is scrolled in units of a certain number of lines. In the similar manner, the display area is scrolled in units of a certain number of pixels (e.g., several tens of pixels) in the data generating apparatus 1. When the display area is scrolled continuously in a short time, images are seen by a user to move smoothly on the screen. The measurement of the display time t is started immediately after the first scrolling. If the next scrolling is performed before the result of the measurement reaches a predetermined time (e.g., 0.5 second), the display time t is set to zero. If the result of the measurement reaches the predetermined time before the next scrolling is performed, the display time t is set to one.

Figure 4:
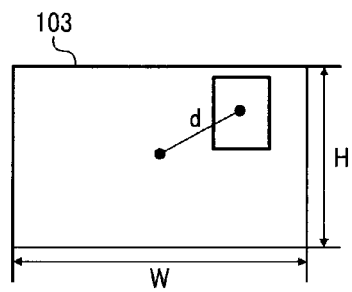
FIG. 4 is a schematic diagram representing a relationship between a screen on a display and a distance d.

FIG. 4 is a schematic diagram representing a relationship between the screen of the display 103 and the distance d. As shown in FIG. 4, the distance d is a length between the center of the screen and the center of the image (center of gravity of the rectangle), which is measured in units of pixels. The degree of confirmation c is calculated by Equation (1), where "W" is width of the screen.

$$c = \left(-\frac{4}{W^2}d^2 + 1\right) \times z \times t \text{ if } (c < 0); \text{ then; } c = 0 \qquad (1)$$

The value of the first term on the right side in Equation (1) increases on the plus side as the distance d decreases. Assuming that the distance d is from the center to the left or right edge of the screen, the value of the first term on the right side becomes zero.

Generally, a user often focuses around the center of the screen, so that images browsed by the user around the center of the screen are confirmed by the user with higher possibility. The number of images displayed in the display area decreases as the magnification factor z increases. Therefore, when the magnification factor z is large, the images are confirmed by the user with higher possibility. The display time t that is binary data indicates whether images are confirmed by a user or have merely passed through the screen by continuous scrolling.

The predetermined time as a reference for determining the display time t is set to 0.5 second as a default value; however, the predetermined time varies among individuals depending upon a user's skill or preference in computer or the like, so that it can be changed depending upon a user. The degree of confirmation c takes the maximum value of 255 and is calculated only for images in the display area. The degree of confirmation c is calculated every scrolling. If the degree of confirmation c is smaller than a precedingly calculated degree of confirmation c, the degree of confirmation c is not updated.

Figure 5:
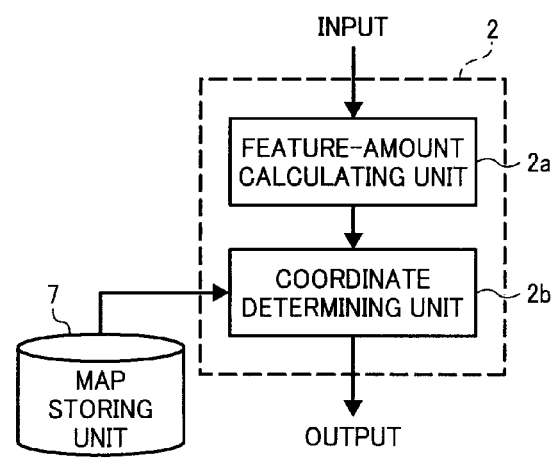
FIG. 5 is a block diagram of an image arranging unit shown in FIG. 3.

FIG. 5 is a block diagram of the image arranging unit 2. As shown in FIG. 5, the image arranging unit 2 includes a feature-amount calculating unit 2a and a coordinate determining unit 2b. The feature-amount calculating unit 2a calculates an N-dimensional feature-amount vector representing features of an image for each piece of input image data. For example, the feature-amount calculating unit 2a calculates three types of feature amounts of each image including color feature amount, edge feature amount, and texture feature amount as a three-dimensional vector.

The color information about each pixel in an image represents gradations of three primary colors, i.e., red (R), green (G), and blue (B), by 256 gradation levels from 0 to 255. If the gradation level of all of the three primary colors is zero, the pixel is black. If the gradation level of each of the three primary colors is 255, the pixel is white. In this manner, the three-dimensional color information in the standard RGB (sRGB) color system is given to each pixel.

Figures 6, 7:
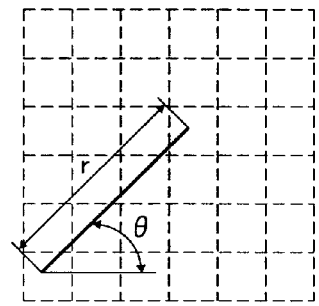
FIG. 6 is a schematic diagram illustrating a filtering matrix.
FIG. 7 is a schematic diagram for explaining a relative position of lightness of a grayscale image.

The feature-amount calculating unit 2a calculates an edge feature amount in the following manner. First, each pixel of the pixel matrix in an image is convolved with a filter matrix of 3×3 pixels as shown in FIG. 6. The value "four" of the central pixel in the filter matrix is given to a target pixel in the image, and the values of the pixels around the central pixel in the filter matrix are given to the pixels around the target pixel in the image. The convolution integral is performed on the whole image to obtain an edge image. Thereafter, the pixels are binarized by using a predetermined threshold (e.g., 128). Next, the whole image is divided into 10×10 blocks each having the same size. The number of pixels exceeding the threshold is counted for every block, which is divided by the pixels included in the block, thereby obtaining a 100-dimensional vector.

A color feature amount is calculated by the feature-amount calculating unit 2a in the following manner. First, an image in the sRGB color system is converted into that in the Lab color system based on Equation (2).

$$R' = R^{2.2}, G' = G^{2.2}, B' = B^{2.2} \quad (2)$$

$$X = 0.39R' + 0.37G' + 0.19B'$$

$$Y = 0.21R' + 0.70G' + 0.09B'$$

$$Z = 0.02R' + 0.11G' + 0.96B'$$

$$L^* = 116\left(\frac{Y}{Y_n}\right)^{1/3} - 16$$

$$a^* = 500\left(\left(\frac{X}{X_n}\right)^{1/3} - \left(\frac{Y}{Y_n}\right)^{1/3}\right)$$

$$b^* = 200\left(\left(\frac{Y}{Y_n}\right)^{1/3} - \left(\frac{Z}{Z_n}\right)^{1/3}\right)$$

Assuming that a D65 light source is used, Xn=95, Yn=100, and Zn=109. Then, the image is divided into 10×10 blocks in the same manner as the calculation of the edge feature amount, and the average Lab is calculated for each block, thereby obtaining a 300-dimensional vector (i.e., 100×3=300).

The texture feature amount is calculated by the feature-amount calculating unit 2a by using a known density co-occurrence matrix. In the density co-occurrence matrix, a frequency at which a pixel indicative of 1 is present on a relative position located δ(r,θ) away from a pixel with the lightness of k of the grayscale image in a certain small area is called pδ(r,θ). The image in the sRGB color system is converted into the grayscale image. Thereafter, the lightness of each pixel is divided by 16, where the remainder is ignored, to quantize each pixel into 16 levels. Then, a 16×16 dimensional density co-occurrence matrix is obtained based on Equation (3), where "m" is the number of gradations (in this case, "m" is 16).

$$f = \sum_{k=0}^{m-1}\sum_{l=0}^{m-1} p_\delta(k,l) \quad (3)$$

In the present embodiment, three density co-occurrence matrixes δ(1,0), δ(1,45), and δ(1,90) are obtained, so that a 768-dimensional feature-amount vector is finally obtained (i.e., 256×3=768). The density co-occurrence matrix is a feature amount representing the outline of frequency information of an image, so that the density co-occurrence matrix can be used for calculating the texture feature amount. The Fourier transformation can be used for obtaining the frequency information. If the image data files stored in the MFP are compressed using the JPEG format, the frequency information can be easily obtained by using discrete cosine transform (DCT).

In the above manner, an 1168-dimensional feature-amount vector is finally obtained (i.e., 100+300+768=1168). The edge information, the color information, and the texture information are values with different scales, so that it is preferable to weight each of the vectors.

The coordinate determining unit 2b determines the position of each image in the image list based on the map that is generated in a matrix manner in advance and the feature amounts calculated by the feature-amount calculating unit 2a. The map stores data on which a vector of a dimension same as that of a feature amount is associated with each intersection of grids having a specific size for the whole image list. The coordinate determining unit 2b outputs a coordinate of the intersection of the grids that is associated with a vector closest to the feature amount vector calculated by the feature-amount calculating unit 2a as a coordinated of the input image.

A map storing unit 7 stores therein the map. A self-organizing map is used as the map for visually recognizing a plurality of multivalued vectors with ease, which is briefly explained below although details are disclosed in references such as "Self-organized formation of topologically correct feature maps", T. Kohonen, Biological Cybernetics, 43:59-69, 1982. First, an image as a final output image is divided into grids having a specific size. Various images are input, and the feature amounts are calculated for each of the images in the same manner as performed by the feature-amount calculating unit $2a$. A vector $W_{xyi}$ (hereinafter, a weighted vector of a node) having a dimension same as that of the input vector is assigned to each node that is an intersection of grids. The suffixes "x" and "y" denote a row and a column of a node, and the suffix "i" denotes an eigenvalue of a vector, in the weighted vector $W_{xyi}$. A random value is input to each weighted vector in advance. Then, a node having a weighted vector closest to the vector obtained from each image is searched for (Step 1). Although a distance can be measured using various methods, the Euclidean distance is used in the present embodiment. When the node in the X row and Y column is closest to the zero-th input vector, the weighted vector of each node is recalculated by using Equation (4) (Step 2).

$$W_{xyi} = W_{xyi} + \alpha h((x, y), (X, Y))(W_{XYO} - W_{XYi}) \quad (4)$$

$$h((x, y), (X, Y)) = \exp\left(-\frac{((x - X)^2 + (y - Y)^2)}{\sigma^2}\right)$$

where $\alpha$ is a parameter indicative of a learning rate ($\alpha$=100 in the present embodiment).

The above Step 1 and Step 2 are repeated until the weighted vectors converge. As a result, images having close feature amounts are arranged close to one another, and images having feature amounts not close to one another are not arranged close to one another, in the image list. Thus, similar images gather in each area of the image list. A user can reach a desired image by following images considered to be similar to the desired image, so that the user can search for images efficiently compared to the case of randomly confirming images one by one.

Figure 8:
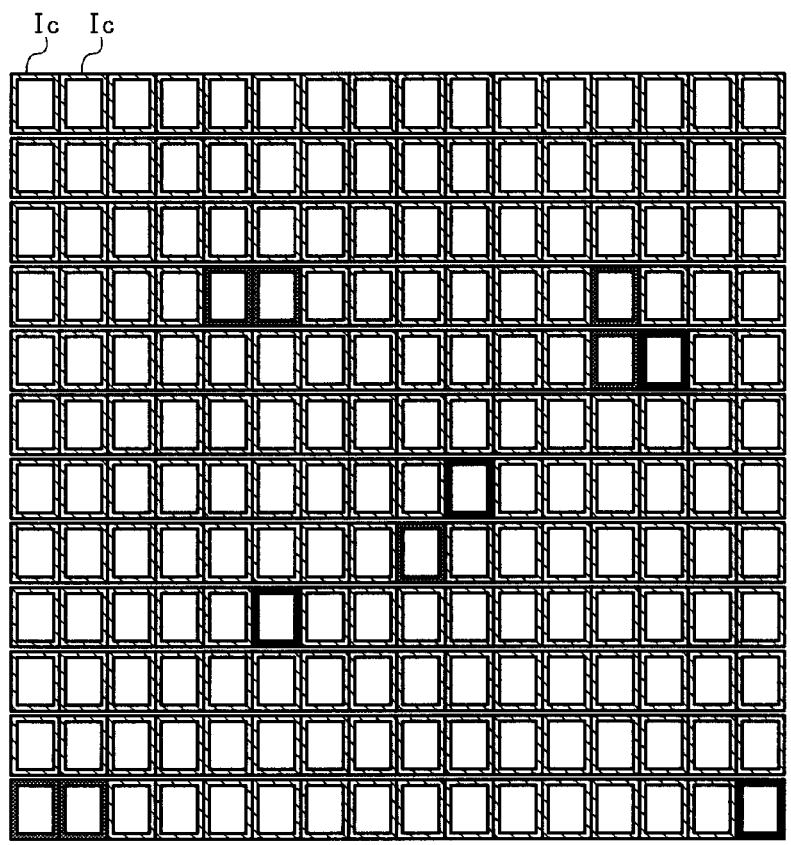
FIG. 8 is a schematic diagram illustrating the image list after modification.
Figure 9:
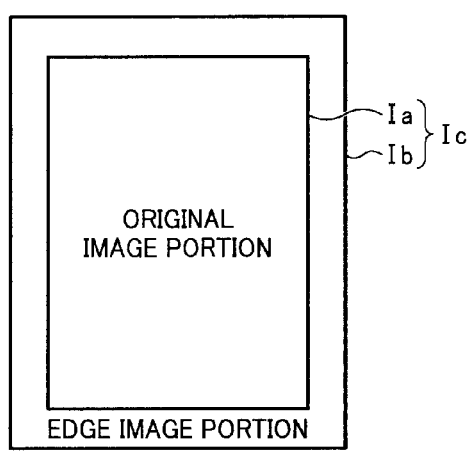
FIG. 9 is an enlarged schematic diagram illustrating an image in the image list shown in FIG. 8.

The processing unit 4 modifies each image in the image list based on the degree of confirmation c. FIG. 8 is a schematic diagram illustrating an example of the image list after modification. As shown in FIG. 9, each image Ic in the image list includes a rectangular original image portion Ia and an edge portion Ib that surrounds the original image portion Ia like a frame. The original image portion Ia is an image obtained by expanding an image based on the image data file with little change. The edge portion Ib is provided by the image arranging unit 2 to surround the original image portion Ia.

The processing unit 4 modifies the image Ic by, for example, changing the color of the edge portion Ib based on the degree of confirmation c. Specifically, the color of the edge portion Ib is made darker as the degree of confirmation c increases, and is set to remarkably light when the degree of confirmation c takes an initial value. When the grayscale is used for the color of the edge portion Ib, the grayscale levels of 0 to 255 can be assigned to the degree of confirmation c of 0 to 255, respectively.

As shown in FIG. 8, images with high degree of confirmation c, i.e., images that have been confirmed by a user with high probability, are displayed so that the edge portions Ib thereof are dark. Therefore, it is possible to easily determine whether each image Ic has already been confirmed by focusing on the edge portion Ib of each image Ic. Thus, a user can easily recognize the area that the user has confirmed in the image list.

The edge portion Ib is preferably represented in colors. For example, if the color of the edge portion Ib is determined based on following Equation (5) by using the degree of confirmation c, hue of the edge portion Ib changes depending upon the degree of confirmation c, so that the images that have already been confirmed can be distinguished from the images that have not been confirmed more clearly.

$$R = 255 - c \quad (5)$$
$$G = 225 - \left(\frac{255}{128^2 \times (c - 128)^2}\right)$$
$$B = c$$

In the present embodiment, the degree of confirmation c is calculated for each image Ic; however, the degree of confirmation c can be calculated for each pixel and the degrees of confirmation c of pixels in each image Ic can be summed up to obtain the degree of confirmation c for each image Ic. Moreover, in the present embodiment, the color of the edge portion Ib is changed depending upon the degree of confirmation c; however, hue of the original image itself can be changed. Furthermore, instead of the edge portion Ib as a mark image, a file-name portion in which a file name is written can be provided to surround the original image portion Ia, and color, size, or font of the file name can be changed depending upon the degree of confirmation c.

The data generating apparatus 1 includes a database constructing unit (not shown) that constructs an image database including file names of the image data files and the degree of confirmation c in an associated manner. Upon completion of the start of the software by a user, the database constructing unit updates the image database in the hardware based on the degree of confirmation c of each image displayed at this time. Thereafter, the image data files are deleted from the temporary storing area in the hard disk.

Upon restart of the software, the data generating apparatus 1 stores therein the image data files received from the MFP 100 in the temporary storing area, and then generates the image list in the above described manner. Immediately thereafter, the data generating apparatus 1 checks whether there is an image in the image database corresponding to each of the images in the image list. If there is a corresponding image in the image database, the initial values of the degree of confirmation c of the image are updated to the values stored in the image database, and the edge portions Ib of the image are modified based on the values. In this manner, a browsing history of a user of a preceding image list is reflected in the current image list.

In the image list immediately after the start of the software, the edge portions Ib of images that were not in the preceding image list are light in color because the degree of confirmation c is set to the initial value, so that the images can be easily distinguished from images included in the preceding image list. In other words, the images newly registered in the MFP 100 are noticeable. Therefore, a user can easily search for newly registered images from the image list. Even if the degree of confirmation c of the images located around the newly registered images are relatively small, i.e., even if the images around the newly registered images are difficult to distinguish from the newly registered images, the images are light in color in this area compared to other areas, so that this area is noticeable by a user. Thus, a user can search for newly registered images easily merely focusing on the area with light color.

In some cases, a user does not want to reflect the degree of confirmation c of the images in the preceding image list in the current image list immediately after starting the software. For example, when there are images that were not search targets in the preceding image list, the degree of confirmation c in the preceding image list may interfere with searching for images. In such case, a user can initialize the degree of confirmation c of each image in the current image list by operating the mouse 102 or the like.

The definition of the distance d is changed depending upon the condition as shown in Table 1 in a data generating apparatus in a modified example.

TABLE 1

|  |  | DISTANCE d | |
| --- | --- | --- | --- |
|  |  | SCROLLING STOPPED | SCROLLING |
| MOVEMENT OF MOUSE POINTER | STOP | SCREEN CENTER TO IMAGE CENTER | SCREEN CENTER TO IMAGE CENTER |
|  | MOVING | MOUSE POINTER TO IMAGE CENTER | SCREEN EDGE TO IMAGE CENTER |

When the screen is not scrolling and the mouse pointer is stopped, it is assumed with high possibility that a user focuses on images around the center of the screen. In this case, the distance d is defined to be between the center of the screen and the center of an image in the same manner as the above embodiment.

When the screen is not scrolling while the mouse pointer is moving, it is assumed with high possibility that a user follows the moving mouse pointer with eyes without focusing on the center of the screen. In this case, the distance d is defined to be between the mouse pointer and the center of the image.

When the screen is scrolling and the mouse pointer is moving, i.e., the screen is scrolled by the drag operation, it is assumed with high possibility that a user follows an area other than the mouse pointer with eyes. For example, when a user is moving the display area to the right side of the screen by the drag operation, the user's eyes follow the mouse pointer until the user starts moving the mouse pointer for the drag operation, but move in a direction of an area that the user wants to confirm after starting the drag operation. When the screen is scrolling in such manner, a user often focuses on the edge of the screen. Therefore, when the screen is scrolling and the mouse pointer is moving, the distance d is defined to be between the edge of the screen and the center of the image. The definition of the distance d is changed depending upon the operation condition by a user in such manner, so that user's attention to images can be reflected in the degree of confirmation c more precisely compared to the case of fixing the definition of the distance d.

The technology has been known in which the optical character recognition (OCR) process is performed on a document image to extract a title to set a file name or to realize a full-text search. However, the recognition rate of the OCR process is under 100% even if a document is scanned in ideal conditions, and there are generally plenty of recognition errors occurred particularly in a document containing large number of characters. For example, if the recognition rate of the OCR process is 98%, eight characters are misidentified in a general 400-character manuscript paper. Furthermore, the actual recognition rate is largely lowered depending upon the type of a document and a scanning condition. Therefore, a word in a document sometimes cannot be searched for in the OCR process. Moreover, there are many documents containing few characters. Thus, the image searching from the image list is more advantageous.

When searching for a certain business form image from among business form images in the same format using thumbnails thereof, the business form image is difficult to distinguish from others. The business form images are the same except characters in specific blanks, so that they appear to be the same in reduced images. Therefore, in the conventional thumbnail display, a user has to repeat the operation of opening images of the thumbnails one by one by image display software, magnifying each image to the size with which the user can identify characters in the image, and thereafter closing the image display software. In the image list generated by the data generating apparatus according to the present embodiment, even when a user cannot be sure whether an image is the desired image, the user scrolls the screen without opening the image with the image display software and can easily find the image through confirming images by scrolling because the desired image has a higher degree of confirmation c.

The present embodiment can be applied to a machine-readable recording medium that records the following computer program for causing a computer to function as the data generating apparatus that generates image display data for displaying images on the display unit such as a display. The computer program causes the computer to function as a unit to execute an image constructing process, a display-data outputting process, a confirmation calculating process, and an image modifying process. The image constructing process is for constructing the image list including a plurality of images corresponding to a plurality of image data files arranged one another. The display-data outputting process is for outputting display data for displaying all or part of the image list, and thereafter outputting display data for displaying only an area in accordance with a user's switching operation for switching a display area or a display magnification of the image list on the screen of the image display unit of the all area of the image list based on the user's switching operation. The confirmation calculating process is for calculating a degree of confirmation c as an index representing whether each of the images in the image list is confirmed by a user based on the user's switching operation. The image modifying process is for modifying images in the image list in accordance with the result of the calculation in the confirmation calculating process.

In the data generating apparatus, the confirmation calculating unit 5 is configured such that the display time t of displaying the images Ic in the image list on the display 103 is calculated based on the specifying operation of the display area by the mouse and the degree of confirmation c of the image Ic increases as the calculated display time t increases. With this configuration, the degree of confirmation c can function as an index representing whether the image is confirmed by a user by assuming that the image Ic is confirmed by the user with high possibility when the display time t of the image Ic is long.

Furthermore, the confirmation calculating unit 5 is configured such that the magnification factor z as a displaying magnification on the display 103 is calculated based on the specifying operation and the degree of confirmation c of the image Ic increases as the calculated magnification factor z increases. With this configuration, the degree of confirmation c can function as an index representing whether the image Ic is confirmed by a user by assuming that the image Ic is confirmed by the user with high possibility when the magnification factor z of the image Ic is large.

Moreover, the confirmation calculating unit 5 is configured such that the distance d is calculated based on the specifying operation and the degree of confirmation c of the image Ic increases as the calculated distance d decreases. With this configuration, the degree of confirmation c can function as an index representing whether the image Ic is confirmed by a user by assuming that the image Ic is confirmed by the user with high possibility when the distance d is small.

Furthermore, the display time t, the magnification factor z, and the distance d are combined to be reflected in the degree of confirmation c, so that the degree of confirmation c can function as an index capable of making a quantitative judgment (i.e., to what degree a user has confirmed images) not a qualitative judgment (i.e., whether a user has confirmed images).

Moreover, the image constructing unit constructs the image list such that the edge image Ib as a mark image is provided around each image, and the processing unit 4 as the image modifying unit modifies the edge image Ib in accordance with the degree of confirmation c. With this configuration, a user can recognize the degree of confirmation c based on the change in the edge portion Ib.

Furthermore, the database constructing unit for constructing the image database in which the image data files and the degree of confirmation c corresponding to the image data files are associated and are stored is provided, and the image arranging unit 2 as the image constructing unit constructs the image list based on the image database. With this configuration, the degree of confirmation c of the images in the preceding image list can be reflected in the current image list.

Moreover, the confirmation calculating unit 5 initializes the degree of confirmation c based on the initialization operation by a user, so that it is prevented that the degree of confirmation c in the preceding image list interferes with the image search when searching for an image that was not a search target in the preceding image list.

Furthermore, the data generating apparatus in the modified example includes a pointer displaying unit (not shown) that displays a mouse pointer for pointing a user-specified point on the screen of the display 103. The confirmation calculating unit 5 is configured such that the definition of distance d can be changed based on the movement of the mouse pointer. With this configuration, user's attention to images can be reflected in the degree of confirmation c more precisely compared to the case of fixing the definition of the distance d.

According to one aspect of the present invention, a user can easily recognize whether each image has been confirmed in the image list.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for generating display data for displaying an image on a display unit, the apparatus comprising:
   an image constructing unit that constructs an image of an image list including a plurality of images each corresponding to an image data file arranged in a form of a list;
   a data output unit that outputs first display data for displaying a first display of the image list on the display unit, and then, when a switching command for switching at least one of a display area and a display magnification is received from a user, outputs second display data for displaying a second display of the image list in response to the switching command;
   a confirmation calculating unit that calculates a degree of confirmation for each of the images in the image list based on a calculated distance between a center of a screen area of the display unit and a location of each of the images in the image list, when a pointer on the display unit is not moving, that calculates the degree of confirmation for each of the images in the image list based on a calculated distance between a location of the pointer and the location of each of the images in the image list, when the pointer on the display unit is moving, and that calculates the degree of confirmation for each of the images in the image list based on a calculated distance between an edge of the screen area and the location of each of the images in the image list, when the pointer on the display unit is moving and a scrolling operation in performed, each of the images being at a different location, the degree of confirmation indicating whether a user confirmation is performed for each of the images in the image list; and
   an image modifying unit that modifies the images in the image list based on the corresponding degree of confirmation, wherein
   the display unit displays the modified images that are modified based on the corresponding degree of confirmation.

2. The apparatus according to claim 1, further comprising a time measuring unit that measures a display time of each of the images in the image list, wherein
   the confirmation calculating unit calculates the degree of confirmation based on the display time measured by the time measuring unit, and
   as the degree of confirmation increases, the image modifying unit increases a degree of modification of the images in the image list.

3. The apparatus according to claim 1, further comprising a magnification measuring unit that measures the display magnification of each of the images in the image list, wherein
   the confirmation calculating unit calculates the degree of confirmation based on the display magnification measured by the magnification measuring unit, and
   as the degree of confirmation increases, the image modifying unit increases a degree of modification of the images in the image list.

4. The apparatus according to claim 1, further comprising a distance calculating unit that calculates the calculated distance between the center of the screen area of the display unit and the location of each of the images in the image list, wherein
   as the degree of confirmation increases, the image modifying unit increases a degree of modification of the images in the image list.

5. The apparatus according to claim 4, further comprising a pointer displaying unit that displays the pointer for pointing a user-specified point on the display unit.

6. The apparatus according to claim 1, wherein
   the image constructing unit constructs the image of the image list with a mark image around or in each of the images, and
   the image modifying unit modifies the mark image based on the degree of confirmation.

7. The apparatus according to claim 1, further comprising a database constructing unit that constructs a database that stores therein the image data files and degrees of confirmation each corresponding to each of the image data files, wherein the image constructing unit constructs the image of the list image based on the image data files and the degrees of confirmation stored in the database.

8. The apparatus according to claim 7, wherein when an initialization command is received from the user, the confirmation calculating unit initializes the degrees of confirmation stored in the database.

9. The apparatus according to claim 1, wherein the image modifying unit modifies each of the images in the image list in response to the corresponding degree of confirmation exceeding a predetermined threshold.

10. The apparatus according to claim 1, wherein the confirmation calculating unit calculates the degree of confirmation for each of the images in the image list based on a display time of each of the images in the image list, the display magnification of each of the images in the image list, and the calculated distance between the center of the screen area of the display unit and the location of each of the images in the image list.

11. The apparatus according to claim 1, wherein
the calculated distance between the center of the screen area of the display unit and the location of each of the images in the image list corresponds to a length between the center of the screen area of the display unit and a center of each of the images in the image list, and
the center of each of the images in the image list is measured in units of a pixel.

12. The apparatus according to claim 1, wherein
the calculated distance between the center of the screen area of the display unit and the location of each of the images in the image list corresponds to a distance between the center of the screen area of the display unit and a center of each of the images in the image list,
the calculated distance between the location of the pointer and the location of each of the images in the image list corresponds to a distance between the location of the pointer and the center of each of the images in the image list, and
the calculated distance between the edge of the screen area and the location of each of the images in the image list corresponds to a distance between the edge of the screen area and the center of each of the images in the image list.

13. A method of generating display data for displaying an image on a display unit, the method comprising:
constructing an image of an image list including a plurality of images each corresponding to an image data file arranged in a form of list;
outputting including outputting first display data for displaying a first display of the image list on the display unit, and then, when a switching command for switching at least one of a display area and a display magnification is received from a user, outputting second display data for displaying a second display of the image list in response to the switching command;
calculating a degree of confirmation for each of the images in the image list based on a calculated distance between a center of a screen area of the display unit and a location of each of the images in the image list, when a pointer on the display unit is not moving, calculating the degree of confirmation for each of the images in the image list based on a calculated distance between a location of the pointer and the location of each of the images in the image list, when the pointer on the display unit is moving, and calculating the degree of confirmation for each of the images in the image list based on a calculated distance between an edge of the screen area and the location of each of the images in the image list, when the pointer on the display unit is moving and a scrolling operation in performed, each of the images being at a different location, the degree of confirmation indicating whether a user confirmation is performed for each of the images in the image list;
modifying the images in the image list based on the corresponding degree of confirmation; and
displaying, using the display unit, the modified images that are modified based on the corresponding degree of confirmation.

14. An apparatus for generating display data for displaying an image on a display unit, the apparatus comprising:
an image constructing unit that constructs an image of an image list including a plurality of images each corresponding to an image data file arranged in a form of a list;
a data output unit that outputs first display data for displaying a first display of the image list on the display unit, and then, when a switching command for switching at least one of a display area and a display magnification is received from a user, outputs second display data for displaying a second display of the image list in response to the switching command;
a confirmation calculating unit that calculates a degree of confirmation for each of the images in the image list based on a calculated distance between a center of a screen area of the display unit and a location of each of the images in the image list, when a pointer on the display unit is not moving, and that calculates the degree of confirmation for each of the images in the image list based on a calculated distance between a location of the pointer and the location of each of the images in the image list, when the pointer on the display unit is moving, each of the images being at a different location, the degree of confirmation indicating whether a user confirmation is performed for each of the images in the image list; and
an image modifying unit that modifies the images in the image list based on the corresponding degree of confirmation, wherein
the display unit displays the modified images that are modified based on the corresponding degree of confirmation,
the confirmation calculating unit calculates the degree of confirmation for each of the images in the image list based on the calculated distance between the location of the pointer and the location of each of the images in the image list, when the pointer on the display unit is moving and the switching command is not received, and
the confirmation calculating unit calculates the degree of confirmation for each of the images in the image list based on a calculated distance between an edge of the screen area and the location of each of the images in the image list, when the pointer on the display unit is moving and the switching command is received.

* * * * *